(12) United States Patent
Martin et al.

(10) Patent No.: US 8,837,587 B2
(45) Date of Patent: Sep. 16, 2014

(54) PROCESS FOR CODING AND DECODING VIDEO DATA OF A SEQUENCE OF IMAGES AND CORRESPONDING ENCODER AND DECODER

(75) Inventors: Aurelie Martin, Paris (FR); Dominique Thoreau, Cesson Sevigne Cedex (FR); Edouard Francois, Bourg des Comptes (FR); Jerome Vieron, Paris (FR); Fabien Racape, Rennes (FR); Christine Guillemot, Le Chesnay Cedex (FR); Jean-Jacques Fuchs, Le Chesnay Cedex (FR)

(73) Assignee: Thomson Licensing, Issy les Moulineaux (FR)

( * ) Notice: Subject to any disclaimer, the term of this patent is extended or adjusted under 35 U.S.C. 154(b) by 192 days.

(21) Appl. No.: 13/379,184

(22) PCT Filed: Jun. 16, 2010

(86) PCT No.: PCT/EP2010/058478
§ 371 (c)(1),
(2), (4) Date: Jun. 15, 2012

(87) PCT Pub. No.: WO2010/149554
PCT Pub. Date: Dec. 29, 2010

(65) Prior Publication Data
US 2012/0250764 A1 Oct. 4, 2012

(30) Foreign Application Priority Data

Jun. 22, 2009 (EP) ..................................... 09305584

(51) Int. Cl.
*H04N 7/32* (2006.01)
*H04N 19/61* (2014.01)

(52) U.S. Cl.
CPC ....................................... *H04N 7/50* (2013.01)
USPC ..................................................... 375/240.12

(58) Field of Classification Search
None
See application file for complete search history.

(56) References Cited

PUBLICATIONS

A. Martin etal: "Sparse Representation for Image Prediction", Proceedings of the 15th European Signal Processing Conf., Sep. 3, 2007, pp. 1255-1259.

(Continued)

*Primary Examiner* — Sath V Perungavoor
*Assistant Examiner* — Kato Luo
(74) *Attorney, Agent, or Firm* — Tutunjian & Bitetto, P.C.

(57) ABSTRACT

The process comprising splitting of an image into blocks, intra coding of a current block using spatial prediction based on a matching pursuit algorithm selecting, from a dictionary of atoms, the atom the most correlated with a causal neighborhood of the current block, is characterized in that it performs the following steps: — determination of the two dimensional shift between the causal neighborhood and the selected atom, — generation of at least, a new phased atom taking into account the values of the two dimensional spatial shift, — use of this new atom for intra prediction, according to the matching pursuit algorithm, if better correlated than the selected one. Application to video data compression.

10 Claims, 1 Drawing Sheet

Figure 1:
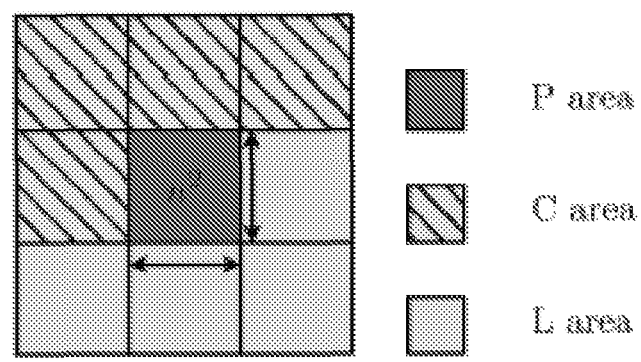

P area
 C area
 L area

(56) References Cited

PUBLICATIONS

P. Jost et al: "MoTIF: An Efficient Algorithm for Learning Translation Invariant Dictionaries" Proceedings of the 2006 IEEE Int'l Conf. May 14, 2006, pp. V-857-V-860.

A. Martin etal: "Phase refinement for image prediction based on sparse representation", Proceedings of the Conf. on Visual I, vol. 7543, Jan. 2010.

A. Martin etal: "Atomic decompostion dedicated to AVC and spatial SVC prediction" Image Processing, 2008, 15th IEEE, Oct. 12, 2008, pp. 2492-2495.

L. Granai etal: "Hybrid video coding based on bidimensional matching pursuit" EURASIP Journal on Applied Signal Processing, vol. 2004, No. 17, Dec. 15, 2004, pp. 2705-2714.

S.G. Mallatetal: "Matching pursuits with time-frequency dictionaries", IEEE Transactions on Signal Processing, vol. 41, No. 12, Dec. 1, 1993, pp. 3397-3415.

C.D. Kuglin etal: "The Phase Correlation Image Alignment Method", Proceedings of the Int'l Conf. on Cybernetics and Society, Sep. 23, 1975, pp. 163-165.

R. Neff etal: "Matching pursuit based video compression" ITU Study Group 16, No. M0317, Nov. 3, 1995.

Search Report Dated Sep. 24, 2010.

PROCESS FOR CODING AND DECODING VIDEO DATA OF A SEQUENCE OF IMAGES AND CORRESPONDING ENCODER AND DECODER

This application claims the benefit, under 35 U.S.C. §365 of International Application PCT EP 2010 058478, filed Jun. 16, 2010, which was published in accordance with PCT Article 21(2) on Dec. 29, 2010 in English and which claims the benefit of European patent application No. 09305584.6, filed Jun. 22, 2009.

The invention relates to a video coding and decoding process and more particularly a phase refinement process for image prediction based on sparse representation.

The goal is to propose a tool to be used at the encoder and at the decoder that would improve the video coding performance by keeping the same quality for a lower bit-rate. The problem addressed by the invention is to improve the prediction in the case of spatial and inter image prediction.

In H264/AVC, as disclosed for example in the document of T. Wiegand, G. J. Sullivan, G. Bjontegaard, and A. Luthra, titled "Overview of the H.264/AVC" Circuits and Systems for Video Technology, IEEE Transactions, Vol 13,7, 560-576, July 2003, intra prediction is performed to decorrelate neighbor blocks based on the knowledge of the pixel row and column adjacent to the current block. Several directional modes are specified. The extrapolation is done by simply "propagating" the pixel values along one of the predefined directions. Additionally to these geometrical modes, the DC prediction, the mean of neighboring prior encoded samples, is available. H264/AVC intra coding is very efficient to reconstruct uniform regions or directional structures, especially when one direction of intra modes best fits to the contours.

To address the problem of signal prediction in highly textured areas, methods based on sparse signal approximations are considered here. The goal of sparse approximation techniques is to look for a linear expansion approximating the analyzed signal in terms of functions chosen from a large and redundant set (i.e. dictionary). The MP (Matching Pursuit) algorithm is a possible technique to compute adaptive signal representations by iterative selection of so-called atoms from the dictionary. See paper from Mallat, S. and Zhang, Z., titled "Matching pursuits with time frequency dictionaries," *IEEE Sig. Processing* 41 (December 1993). Here we consider the problem of closed-loop spatial image prediction or extrapolation. It can be seen as a problem of signal extension from noisy data taken from a causal neighborhood. The MP sparse representation algorithm is considered. We also present a way to improve atomic decomposition trough phase refinement of basis functions.

A subject of the invention is a process for the coding of video data of a sequence of images comprising splitting of an image into blocks, intra coding of a current block using spatial prediction based on a matching pursuit algorithm selecting, from a dictionary of atoms, the atom the most correlated with a causal neighborhood of the current block, characterized in that it performs the following steps:
  determination of the two dimensional shift between the causal neighborhood and the selected atom,
  generation of, at least, a new phased atom taking into account the values of the two dimensional spatial shift,
  use of this new atom for intra prediction, according to the matching pursuit algorithm, if better correlated than the selected one.

According to a particular embodiment, atoms of the dictionary are extracted from DCT (Discrete Cosine Transform) and/or DFT (Discrete Fourier Transform) and/or other transforms.

According to a particular embodiment, the determination of the two dimensional spatial shift $\Delta x$, $\Delta y$ comprises:
  a step of calculation of a cross-power spectrum:

$$C = \frac{F_{input} \times F^*_{atom}}{|F_{input} \times F^*_{atom}|}$$

where
  $F_{input}$ is the Fourier transform of the current residual
  $F_{atom}$ is the Fourier transform of the selected atom
  $F^*_{atom}$ corresponding to the complex conjugate of $F_{atom}$
  a step of calculation of the inverse Fourier transform, c, of C
  a step to determine the two dimensional location of the correlation peak $$\{\Delta x, \Delta y\} = \underset{x,y}{\mathrm{argmax}}\{c\}.$$

According to a particular embodiment, the causal neighborhood corresponds to the previously coded blocks adjacent to the current block.

According to a particular embodiment, a matrix A composed of the atoms, to which is multiplied a prediction vector X of pixels to give the vector Y relating to the pixels of the original signal, is constructed from the region taken into account all the blocks adjacent to the current block and is then compacted by masking its rows corresponding to the pixels which are not in the causal area of the neighborhood.

Another subject of the invention is a process for the decoding of video data coded according to the previous process for the coding, characterized in that, for the decoding of a current block, it comprises the following steps:
  calculation of an intra prediction by using a matching pursuit algorithm selecting, from a dictionary of atoms, the atom the most correlated with a causal neighborhood of the current image block to be decoded,
  determination of the two dimensional shift between the causal neighborhood of the current block and the selected atom,
  generation of a new phased atom taking into account the values of the two dimensional spatial shift.
  use of this phased atom, if better correlated than the selected one, as the intra prediction.

Figure 2:
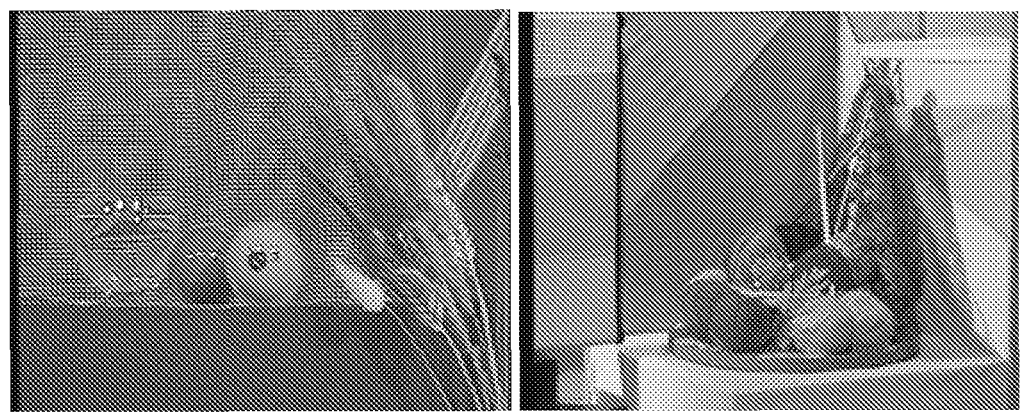

Other features and advantages will become clearly apparent in the following description presented by way of non-limiting examples and with regard to the appended figures that show:
  FIG. 1, a causal area for the prediction of a block P
  FIG. 2, two test images for the simulations.

Matching Pursuit Algorithm

Let Y be a vector of dimension N and A a matrix of dimension N×M with M>>N. The columns $a_k$ of A can be seen as basis functions or atoms of a dictionary that will be used to represent the vector Y. Note that there is an infinite number of ways to choose the M dimensional vector X such that Y=AX. The aim of sparse representations is to search among all these solutions of Y=AX those that are sparse, i.e. those for which the vector X has only a small number of nonzero components.

Indeed one quite generally does not seek an exact reconstruction but rather seeks a sparse representation that satisfies:

$$\|Y-AX\|_2^2 \leq \rho$$

where ρ characterizes an admissible reconstruction error. Since searching for the sparsest representation satisfying this constraint is NP-hard and hence computationally intractable, one seeks approximate solutions. The MP algorithm offers a sub-optimal solution to this problem via an iterative algorithm. It generates a sequence of M dimensional vectors $X_k$ having an increasing number of non zero components in the following way. At the first iteration $X_0=0$ and an initial residual vector $R_0=Y-AX_0=Y$ is computed. At iteration k, the algorithm selects the basis function $a_{j_k}$ having the highest correlation with the current residual vector $R_{k-1}=Y-AX_{k-1}$, that is, such that $$j_k = \underset{j}{\mathrm{argmax}}\, \frac{(a_j^T R_{k-1})^2}{a_j^T a_j}.$$

The weight $x_{jk}$ of this new atom is then chosen so as to minimize the energy of the new residual vector, which becomes thus equal to:

$$R_k = R_{k-1} - \frac{a_j^T R_{k-1}}{a_j^T a_j} a_{j_k}.$$

The new optimal weight is introduced into $X_{k-1}$ to yield $X_k$. Note that the same atom may be chosen several times by MP. In this case, the value of the coefficient is added to the previous one. The algorithm proceeds until the stopping criterion $$\|Y-AX_k\|^2 \leq \rho \quad (1)$$

is satisfied, where ρ is a tolerance parameter which controls the sparseness of the representation.

Prediction Based on MP

In FIG. 1, we define the block P of n×n pixels to be predicted using its causal neighborhood C of size 4n2.

C is the causal area, P is the current block to be predicted and L is the whole area surrounding P.

With the entire region L containing 9 blocks and hence of size 3n×3n pixels, we associate the Discrete Fourier and/or Cosine basis functions expressed respectively as $$g_{p,q}(m,n) = e^{2i\pi\left(\frac{mp}{M}+\frac{nq}{N}\right)} \quad (2)$$

and $$g_{p,q}(m,n) = \cos\left(\frac{(2m+1)p\pi}{2M}\right)\cos\left(\frac{(2n+1)q\pi}{2N}\right) \quad (3)$$

with m and n the coordinates of the pixels of the prediction block, p and q the spatial frequencies.

With these atoms we build the matrix A. In the experiments, this matrix is composed of $9n^2$ atoms (DCT or DFT) or $18n^2$ atoms (DCT and DFT). We denote Y the $9n^2$ dimensional vector formed with the pixel values of the area L and X the vector containing the coefficients of the representation of Y in terms of the basis functions: Y=AX. The matrix A is modified by masking its rows corresponding to the pixels not in the known area C. We thus obtain a compacted matrix Ac whose size is $4n^2 \times 9n^2$ if only the DCT basis is considered. The corresponding components in Y are deleted similarly to get the vector $Y_c$ of $4n^2$ pixels. The MP algorithm is then applied to Ac and $Y_c$.

For later use, we define similarly $A_p$ and $Y_p$ of size $n^2 \times 9n^2$ and n2×1 associated with the area P to be predicted.

Remember that the aim of MP algorithm is to get a sparse representation of Yc. This means that as the complexity of the representation i.e. as the number k of non zero components in X, increases the reconstruction error decreases monotonically.

$$\|Y_c - A_c X_k\|^2$$

Here, $X_k$ denotes the representation proposed by the MP algorithm after k steps. But since our purpose is to get a good prediction of the area P there is of course no reason that the better the representation of the area C, the better the associated prediction of the area P. We will therefore apply to MP a stopping criterion that tends to fulfill this goal, i.e., that tends to minimize the reconstruction error in P. We implement the algorithm so that it generates a sequence of representations $X_k$ of increasing complexity and for each $X_k$ we compute the prediction error energy $$\|Y_p - A_p X_k\|^2$$

and we should thus stop as soon as this prediction error which generically starts decreasing, increases. But since there is no reason that a more complex representation cannot indeed yield a smaller prediction error, we actually proceed differently and consider a two steps procedure.

First the MP algorithm are run until the pre-specified threshold on the reconstruction error in (4) is reached and the resulting $X_k$ sequences are stored. The values of the thresholds are fixed such that the final representation has a quite large number of components, say K. In a second step one then selects the optimal representation as the one that gives the smallest error energy on the area P to be predicted:

$$k_{opt} = \min_{k \in [1,K]} \|Y_p - A_p X_k\|_2^2 \quad (4)$$

Phase Refinement

As exposed previously, the MP algorithm selects the most correlated atoms with neighbor samples. The quality of the extrapolated signal is then highly dependent on the nature of selected atoms. The quest of sparseness is achieved if the considered atom well suits the signal. Actually, one of the big issues of sparse representations is to be able to determine a relevant set of basis functions to represent any kind of features in images. The ideal dictionary is composed of smooth functions to recollect low frequencies, other functions more spatially located for high frequencies, such as edges or contours.

In this section, we address the problem of finding a non exhaustive solution to this question. We propose to work with a limited dictionary and to virtually increase its redundancy by phasing atoms. The main idea is to best fit the input data by searching the appropriate spatial phase thanks to phase correlation.

This frequency domain approach estimates the relative translative movement between two images. In the context of sparse prediction, our goal is to detect the shift between the observation signal (at first step, input signal is the causal neighborhood itself and then at other steps, it corresponds to the residual signal) and the selected bidimensional basis function. The spatial shift of the two signals is reflected as a phase change in the Fourier domain.

We first chose to insert the phase correlation process after the choice of the best correlated atom by the MP. Note that it is an a posteriori treatment necessarily sub-optimal compared to in loop refinement. The first step is to determine the two dimensional shift that might be present between the input data and the selected atom. Let $F_{input}$ be the Fourier transform of the input signal and $F_{atom}$ the Fourier transform of the basis function.

The cross-power spectrum is defined as followed:

$$C = \frac{F_{input} \times F^*_{atom}}{|F_{input} \times F^*_{atom}|}$$

with $F^*_{atom}$ the complex conjugate of $F_{atom}$. The correlation c between the two signals is obtained by calculating the inverse Fourier transform of C. Then, the two dimensional location of the peak in c is detected:

$$\{\Delta x, \Delta y\} = \underset{x,y}{\mathrm{argmax}}\{c\}$$

To increase the reliability of the process, use sub-pixel detection. The second step consists in generating a phased atom taking into account the values of the spatial shift $\{\Delta x, \Delta y\}$. Since the theoric expressions of basis functions in the dictionary are known, there is no ambiguity to calculate the shifted functions.

Result and Implementation

We consider the spatial prediction of blocks of 4×4, 8×8, and 16×16 pixels (n=4, 8 or 16). The Cosine functions have been used to construct the redundant dictionary A. The threshold is set to a value that yields a final representation having K, a quite large number, of non zero components. Then the vector X related to the optimal representation is selected, see (2). In all our simulations ρ is set to 1 in (2). The MP based prediction was integrated in JM 11.0 KTA 1.2 (Key Technical Area) software without any change of the encoder syntax.

The proposed prediction mode substitutes for one AVC mode for each type of intra prediction. The selected AVC mode corresponds to the less chosen mode. Results concerning the following tests are presented: the MP based prediction substitutes one AVC mode when the three prediction types were combined, or when only intra-4×4 and 8×8 were available or just intra-4×4. Note that the software was tuned to turn intra-16×16 prediction off Simulations were performed on a large range of quantization levels to evaluate the Bjontegaard average PSNR improvement of luminance components and bit rate savings. See, "Calculation of average PSNR differences between RD curves", author Gisle Bjontegaard, document VCEG-M33, ITU-T Video Coding Experts Group (VCEG) Meeting, April 2001. Table 1 presents the results for MP prediction on Barbara and two other pictures, pool and wool, test images (720×576) represented on FIG. 2, according to the three types of intra-prediction. The higher rate savings are obtained when there are many 2D patterns in the source frame.

TABLE 1

| | Bjontegaard results (PSNR gains (dB) and rate savings (%)) for MP | | | | | |
|---|---|---|---|---|---|---|
| | 4 × 4 | | 4 × 4, 8 × 8 | | 4 × 4, 8 × 8, 16 × 16 | |
| | psnr | rate | psnr | rate | psnr | rate |
| barbara | +0.71 | −8.3 | +0.58 | −7.57 | +0.57 | −7.78 |
| pool | +1.13 | −12.16 | +1.03 | −11.33 | +0.94 | −11.33 |
| wool | +0.87 | −11.52 | +1.00 | −12.53 | +0.76 | −9.97 |

This new approach of intra prediction MP based offers interesting perspectives compared to directional modes of H264/AVC. For complex textures, the MP algorithm turns out to be an interesting alternative for Intra prediction and also for prediction. By using correlation phase refinement, we can work with a limited dictionary which is virtually increased by the phasing of atoms. Thanks to phase refinement, the complexity is reduced and the reliability of reconstruction is improved. Moreover, due to sub-pel accuracy of phase correlation algorithm, the performance of the type of algorithm is particularly efficient.

The algorithm focuses particularly on shift determination, for example, based in barycenter of the neighbouring energy of the correlation peak and considers there major peaks.

Technical background about phase correlation is, for example, document, authors C D Kuglin & D C Hines, titled "The phase correlation image alignment method" Proc IEEE 1975, Conf Cybernetics and Society pages 163-165 September 1975, and patent application, inventors D Thoreau, C Chevance, titled "Image matching process and device using a weighted phase correlation for determining a shift", EPO 480807, 15.04.1992.

The current proposal concerns all applications in relationship with video compression picture coding schemes.

The invention claimed is:

1. A process for the coding of video data of a sequence of images comprising splitting of an image into blocks, intra coding of a current block using spatial prediction based on a matching pursuit algorithm, selecting, from a dictionary of atoms whose theoric expressions are known, the atom the most correlated with a causal neighborhood of the current block, further comprising:
   determination of a two dimensional spatial shift between the causal neighborhood and the selected atom, wherein the two dimensional spatial shift is reflected as a phase change in the Fourier Domain;
   generation of, at least, a new phased atom taking into account the values of the two dimensional spatial shift,
   use of this new phased atom for intra prediction, according to the matching pursuit algorithm, if better correlated than the selected one.

2. A process according to claim 1, wherein atoms of the dictionary are extracted from DCT (Discrete Cosine Transform) and/or DFT (Discrete Fourier Transform) and/or other transforms.

3. A process according to claim 1, wherein the determination of the two dimensional spatial shift $\Delta x$, $\Delta y$ comprises: calculating a cross-power spectrum:

$$C = \frac{F_{input} \times F^*_{atom}}{|F_{input} \times F^*_{atom}|}$$

where
   $F_{input}$ is the Fourier transform of the current residual
   $F_{atom}$ is the Fourier transform of the selected atom
   $F^*_{atom}$ corresponding to the complex conjugate of $F_{atom}$
   calculating the inverse Fourier transform, c, of C determining the two dimensional location of the correlation peak $$\{\Delta x, \Delta y\} = \underset{x,y}{\mathrm{argmax}}\{c\}.$$

4. A process according to claim 1, wherein the causal neighborhood corresponds to the previously coded blocks adjacent to the current block.

5. A process according to claim 1, wherein a matrix A composed of the atoms, to which is multiplied a prediction vector X of pixels to give the vector Y relating to the pixels of the original signal, is constructed from the region taken into account all the blocks adjacent to the current block and is then compacted by masking its rows corresponding to the pixels which are not in the causal area of the neighborhood.

6. A process for the decoding of a current block comprising
- calculation of an intra prediction by using a matching pursuit algorithm and selection, from a dictionary of atoms whose theoric expressions are known, the atom the most correlated with a causal neighborhood of the current block to be decoded,
- determination of a two dimensional spatial shift between the causal neighborhood of the current block and the selected atom, wherein the two dimensional spatial shift is reflected as a phase change in the Fourier Domain;
- generation of a new phased atom taking into account the values of the two dimensional spatial shift; use of this new phased atom, if better correlated than the selected one, for intra prediction.

7. A process according to claim 6, wherein the determination of the two dimensional spatial shift $\Delta x$, $\Delta y$ comprises: calculating of a cross-power spectrum:

$$C = \frac{F_{input} \times F^*_{atom}}{|F_{input} \times F^*_{atom}|}$$

where
$F_{input}$ is the Fourier transform of the current residual
$F_{atom}$ is the Fourier transform of the selected atom
$F^*_{atom}$ corresponding to the complex conjugate of $F_{atom}$
calculating the inverse Fourier transform, c, of C determining the two dimensional location of the correlation peak $$\{\Delta x, \Delta y\} = \underset{x,y}{\mathrm{argmax}}\{c\}.$$

8. A process according to claim 6, wherein a matrix A composed of the atoms, to which is multiplied a prediction vector X of pixels to give the vector Y relating to the pixels of the original signal, is constructed from the region taken into account all the blocks adjacent to the current block and is then compacted by masking its rows corresponding to the pixels which are not in the causal area of the neighborhood.

9. An encoder for the coding of video data of a sequence of images comprising a module configured to split an image into blocks, a module configured to intra code a current block using spatial prediction based on a matching pursuit algorithm, a module configured to select, from a dictionary of atoms whose theoric expressions are known, the atom the most correlated with a causal neighborhood of the current block, wherein it further comprises:
- a module configured to determine a two dimensional spatial shift between the causal neighborhood and the selected atom, wherein the two dimensional spatial shift is reflected as a phase change in the Fourier Domain;
- a module configured to generate, at least, a new phased atom taking into account the values of the two dimensional spatial shift, and
- an intra prediction module configured to make use of this new phased atom for intra prediction, according to the matching pursuit algorithm, if better correlated than the selected one.

10. A decoder for the decoding of a current block comprising a module configured to calculate an intra prediction by using a matching pursuit algorithm and a module configured to select, from a dictionary of atoms whose theoric expressions are known, the atom the most correlated with a causal neighborhood of the current block to be decoded, further comprising:
- a module configured to determine a two dimensional spatial shift between the causal neighborhood of the current block and the selected atom, wherein the two dimensional spatial shift is reflected as a phase change in the Fourier Domain;
- a module configured to generate, at least, a new phased atom taking into account the values of the two dimensional spatial shift, an intra prediction module configured to make use of this new phased atom for intra prediction, according to the matching pursuit algorithm, if better correlated than the selected one.

* * * * *